United States Patent
Forsberg

(10) Patent No.: US 9,735,889 B2
(45) Date of Patent: Aug. 15, 2017

(54) DATA TRANSMISSION METHOD

(71) Applicant: Transmode Systems AB, Stockholm (SE)

(72) Inventor: Gunnar Forsberg, Stockholm (SE)

(73) Assignee: TRANSMODE SYSTEMS AB, Stockholm (SE)

( * ) Notice: Subject to any disclaimer, the term of this patent is extended or adjusted under 35 U.S.C. 154(b) by 0 days.

(21) Appl. No.: 15/235,274

(22) Filed: Aug. 12, 2016

(65) Prior Publication Data

US 2016/0352434 A1   Dec. 1, 2016

Related U.S. Application Data

(63) Continuation of application No. PCT/SE2015/050171, filed on Feb. 13, 2015.

(30) Foreign Application Priority Data

Feb. 13, 2014   (SE) .................... 1450166-2

(51) Int. Cl.
| | | |
|---|---|---|
| *H04B 10/00* | (2013.01) | |
| *H04B 10/69* | (2013.01) | |
| *H04B 10/077* | (2013.01) | |
| *H04B 10/524* | (2013.01) | |
| *H04B 10/54* | (2013.01) | |
| *H04J 14/00* | (2006.01) | |

(52) U.S. Cl.
CPC ......... *H04B 10/697* (2013.01); *H04B 10/077* (2013.01); *H04B 10/524* (2013.01); *H04B 10/541* (2013.01); *H04B 2210/074* (2013.01)

(58) Field of Classification Search
CPC .. H04B 10/50; H04B 10/516; H04B 10/5161; H04B 10/60; H04B 10/69; H04B 10/075; H04B 10/077
See application file for complete search history.

(56) References Cited

U.S. PATENT DOCUMENTS

| | | | | |
|---|---|---|---|---|
| 6,295,272 | B1 * | 9/2001 | Feldman | H04L 25/4908 370/203 |
| 8,032,021 | B2 * | 10/2011 | Cole | H04J 14/0289 398/180 |
| 2003/0043437 | A1 | 3/2003 | Stough et al. | |
| 2009/0116847 | A1 | 5/2009 | Duan et al. | |
| 2012/0288274 | A1 | 11/2012 | Li | |

FOREIGN PATENT DOCUMENTS

| | | |
|---|---|---|
| DE | 3530546 A1 | 3/1983 |
| WO | 8401679 A1 | 4/1984 |
| WO | 2004107627 A1 | 12/2004 |

* cited by examiner

*Primary Examiner* — Daniel Dobson
(74) *Attorney, Agent, or Firm* — Gabriela B. Tomescu, Esq.; Bergenstrahle & Partners AB

(57) ABSTRACT

Described are, among other things, a method and a receiver for receiving a management data signal in an optical transmission system where a traffic data signal is transmitted as a NRZ modulated signal. The traffic data signal has a management data signal superimposed thereon as a pulse width modulation of the symbols of the NRZ modulated signal. The NRZ modulated signal is received with the data signal superimposed thereon and the traffic data signal is recovered. The recovered traffic data signal in anti-phase is added to the received signal. The management data signal is detected from the added signals.

13 Claims, 4 Drawing Sheets

DATA TRANSMISSION METHOD

This application is the continuation of international Application No. PCT/SE2015/050171, filed 13 Feb. 2015, which claims the benefit of Swedish patent application SE 1450166-2, filed 13 Feb. 2014, the entire contents of which are hereby incorporated by reference.

TECHNICAL FIELD

The present disclosure relates to methods and devices for transmitting data. In particular the present disclosure relates to methods and devices for transmitting traffic data together with management data.

BACKGROUND

Signals sent over optical fibers consist of sequences of binary ones and zeroes. A common modulation used for transmission of the binary sequences is NRZ (Non-return Zero) line code. In a NRZ transmission binary ones are transmitted using one physical condition and binary zeroes are transmitted using another physical condition. In the case of data transmissions over optical fibers light pulses are used to transmit the data. In a typical NRZ line code a light pulse sent by a laser signals a binary one whereas a weaker or no light pulse signals a binary zero.

Further, it is typically desired to add a management channel to the data channel. The management channel can be used to transmit various commands and settings through the system or be used to upgrade software. The management channel can typically be implemented by inserting management channel frames in the data channel. Another way is to send the management data on a separate channel.

Further, the international patent application WO 84/01679 describes a transmission system where an information channel is added to the traffic signal by means of pulse width modulation. The information channel can for example be used to transmit a voice signal.

There is a constant desire to improve the performance in transmission systems. Hence, there is a need for a transmission system with improved performance for transmitting management data together with a data signal.

SUMMARY

It is an object of the present invention to provide a transmission system where a management channel is transmitted together with a data channel with improved performance.

This object and/or others are obtained by the methods and devices as set out in the appended claims.

As has been realized by the inventor, in typical existing systems for transmitting a management channel, the management data will require additional bandwidth. For example if management data frames are inserted in the data channel latency will be introduced and data on the data channel will be delayed. On the other hand if the management channel is sent over a separate channel, there will be a cost for that separate channel.

Further, using a method where information data is superimposed on the data channel by pulse width modulation as described in WO 84/01679 will typically not allow for a high enough data speed on the management data channel. The reason is that the noise introduced by the traffic on the data channel will limit the data speed on a pulse width modulated superimposed management channel to, in some cases, only a few kbit/s, which is typically insufficient for the amount of data to be transmitted on the management data channel.

The noise introduced by the traffic on the data channel, such as NRZ encoded data has to be filtered out in the receiver with a low pass filter. The bandwidth of the low pass filter in the receiver sets a limit to the rate at which the superimposed management data can be detected in the receiver. In a system with much noise the low pass filter has to have a low bandwidth. The bandwidth sets a limit to the data rate that can be superimposed.

To reduce the impact of the NRZ data noise (thereby allowing for a higher data rate on the superimposed data channel), the receiver can be provided with a module for cancelling the noise using the recovered received NRZ bit sequence. The recovered NRZ bit sequence is added in anti-phase to the received bit sequence. Stated differently the recovered NRZ bit sequence is subtracted from the received bit sequence. This operation will to a large extent cancel the noise introduced by the transmitted data signal. The management data can then be recovered from a signal with significantly reduced noise. Hereby it is possible to increase the data rate of the management data signal and still be able to recover the management data signal at the receiver despite the noise introduced by the NRZ data signal. To facilitate the subtraction of the recovered NRZ bit sequence from the received bit sequence, the received bit sequence and the recovered NRZ bit sequence can in an advantageous implementation be low-pass filtered before the sequences are added.

In accordance with one embodiment a method of receiving a management data signal in an optical transmission system, where a traffic data signal is received as a NRZ modulated signal is provided. The traffic data signal has the management data signal superimposed thereon as a pulse width modulation of the symbols of the NRZ modulated signal. The NRZ modulated signal with the data signal superimposed thereon is received as a first signal. Further, the traffic data signal from the first signal is recovered in anti-phase. The recovered traffic data signal in anti-phase is added to the received first signal, forming a second signal. The received signals are advantageously low-pass filtered. In particular the signals to be added are low-pass filtered or the second signal is low-pass filtered. The management data signal from the second signal is detected as a detected management data signal.

In accordance with some embodiment the recovered data signal in anti-phase and the first data signal are low-pass filtered before being added. In accordance with one embodiment the low-pass filter is adapted to attenuate frequencies above the frequency at which the management data signal is transmitted. In accordance with one embodiment the recovered data signal in anti-phase and the first data signal are amplified before being added.

In accordance with one embodiment the management data signal is recovered from the detected management data signal. In accordance with one embodiment, when the management data signal is encoded, the recovered management data signal is decoded to output the management data signal.

The invention also extends to a receiver and to a transmission system adapted to implement the methods as described herein.

BRIEF DESCRIPTION OF THE DRAWINGS

The present invention will now be described in more detail by way of non-limiting examples and with reference to the accompanying drawings, in which.

DETAILED DESCRIPTION

Figure 1:
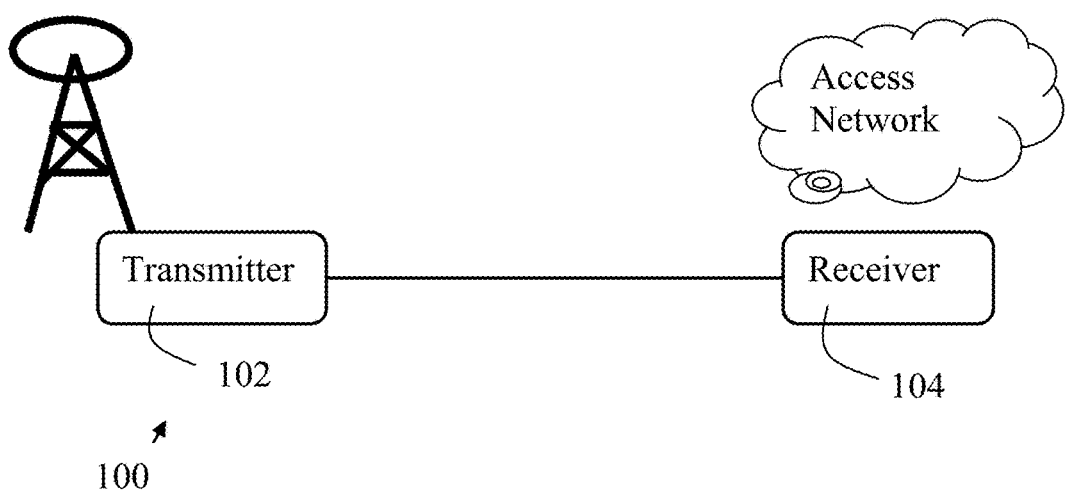
FIG. 1 is a general view of a transmission system.

In FIG. 1 a view of a transmission system 100 is shown. The system comprises a transmitter 102 and a receiver 104. The transmitter 102 transmits data from the transmitter to the receiver 104. The channel between the transmitter and the receiver can be an optical fiber line. The transmitter 102 can for example be associated with a radio base station that transmits data to a receiver 104 associated with an access network over the optical fiber line.

Traffic data on the optical line can be transmitted using a laser transmitting the data in accordance with a NRZ modulating scheme. Further, management data can be superimposed on the NRZ modulated traffic data by pulse width modulating the symbols of the NRZ signal.

The management channel can for example be implemented by superimposing data by pulse width modulation of a management data signal. The pulse width modulation results in that a rising edge of a NRZ signal is time shifted to the left in a time diagram, and a falling edge is time shifted to the right with the same number of pico seconds and vice versa. The pulse width modulation of the NRZ signal thus enables an inclusion of a management channel superimposed to the NRZ signal. Also only one of the falling/rising edges can be time-shifted to add the data of the management channel. In some embodiments the falling/rising edges are shifted in other ways. However, in general the information on the management channel is transmitted by transmitting symbols that are wider and narrower. By transmitting a management data signal as modulation of the pulse width of an optical NRZ signal, the management data signal can be recovered at the receiver as a pulse sequence of wider and narrower light pulses. The management data can in some embodiments be encoded using some code, in particular a code that provides a DC-balancing of the symbols, such as a biphase code or a Manchester code to improve the data transmission. In a DC balanced code the number of transmitted binary ones and binary zeroes are equaled. Coding using a DC balancing code is particularly useful if the management data signal is unbalanced, i.e. comprises more binary ones than binary zeroes, or vice versa.

Hence, the different pulse widths of the NRZ signal represents the management data. In a typical implementation a number of consecutive symbols in the traffic data sequence are variably time increased and decreased to represent the bit sequence of the management data channel. In some implementations the data rate on the management data channel is 150 kbit/s which can be transmitted as a 300 kbaud signal after biphase coding (or similar) of the signal. Higher rates can be used. The management data signal can be superimposed on any traffic data signal. For example the traffic data signal can have a bit rate of 125 Mbit/s up to 12.5 Gbit/s or higher. The traffic data signal can for example be transmitted on a Gigabit Ethernet (GbE) having a rate, after 8B/10B encoding, of 1250 Mbit/s and the management data signal can then be superimposed on the traffic data signal of the GbE.

Figure 2:
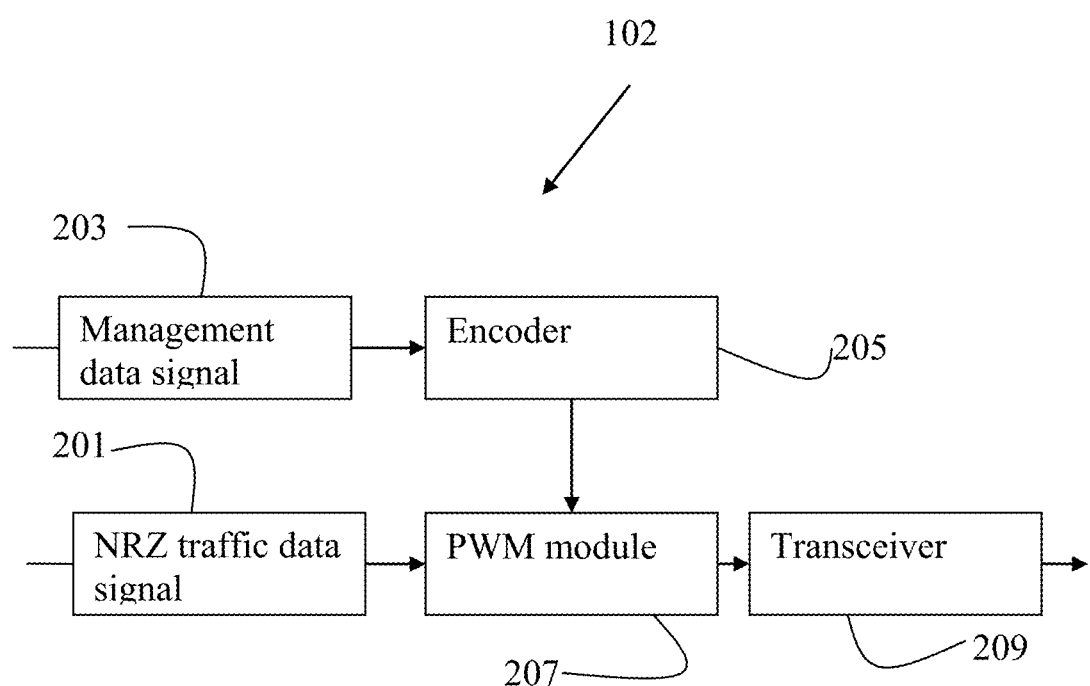
FIG. 2 is a view of a transmitter.

In FIG. 2 a transmitter 102 for generating a NRZ data signal having a pulse width modulated management data signal superimposed thereon is depicted. The transmitter comprises a first input terminal 201 to receive an NRZ data signal. The transmitter further comprises a second input terminal 203 to receive a management data signal. The management data signal can typically be encoded in an encoder 205 for example using a biphase code and is clocked at a rate lower than the NRZ data signal. In particular the management data signal is clocked at a rate that is only a small fraction of the rate of the NRZ data signal such as $\frac{1}{100}$ or $\frac{1}{1000}$ of the rate of the NRZ signal. The transmitter further comprises a pulse width modulator 207 that pulse width modulates the NRZ signal using the management data signal. In accordance with one embodiment the NRZ signal is scrambled to ensure that there are enough falling and rising edges of the pulse train of the NRZ signal during one symbol of the management data signal. The pulse width modulated, possibly scrambled, NRZ signal is transmitted over an optical fiber line using a suitable device such as a transceiver 209.

Figure 3:
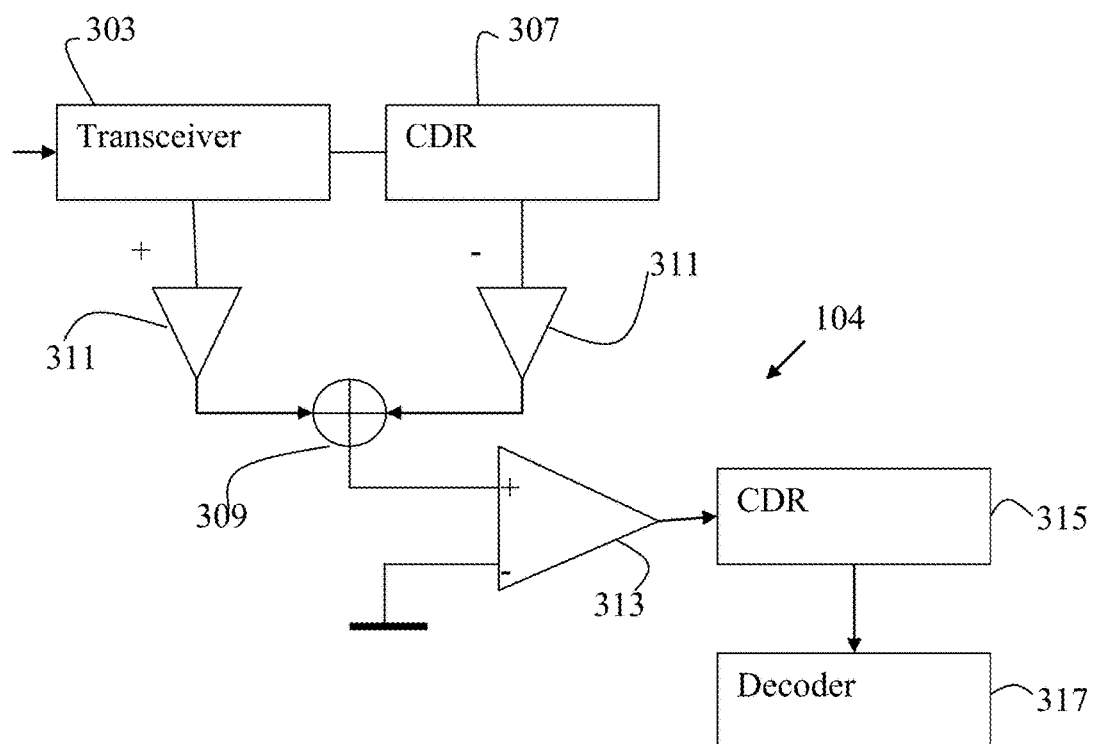
FIG. 3 is a view of a receiver.

In FIG. 3 a receiver 104 for receiving a management data signal is depicted. The receiver is adapted to recover a management data signal in an optical transmission system where a traffic data signal is transmitted as a NRZ modulated signal. The traffic data signal has a management data signal superimposed thereon as a pulse width modulation of the symbols of the NRZ modulated signal. The signal received can for example be generated using a transmitter 102 as described above in conjunction with FIG. 2. The receiver 104 comprises a module 303 such as a transceiver for receiving the signal over an optical fiber line. The module 303 is adapted to output a first signal as the NRZ modulated signal with the data signal superimposed thereon. Further the receiver 104 comprises a clock and data recovery module 307 for recovering the traffic data signal from first signal output from the module 303. It is to be noted that the difference between the received signal and the recovered signal from module 307 is that the recovered signal from block 307 is also recovered with regard to timing. Hence, the signal before the CDR is 2R (re-amplified, and reshaped) whereas the signal after the CDR is 3R (re-amplified, reshaped, and retimed). The module 307 can further be adapted to output the recovered traffic data signal in anti-phase. The receiver 104 is adapted to add the recovered traffic data signal in anti-phase to the received first signal, forming a second signal in an adder 309. Thus, the recovered traffic data signal is subtracted from the received NRZ modulated signal. The received signals are low-pass filtered. In some embodiments the NRZ modulated signal and the recovered traffic data in anti-phase are low-pass filtered and possibly amplified in module(s) 311 before being added in the adder 309. In another embodiment the output signal from the adder is low-pass filtered. The adding of the first signal and the anti-phase signal will cancel or at least significantly reduce the noise introduced in the management data signal by the NRZ modulated signal. The second signal is detected using a detector 313 connected to the output of the adder 309 as the management data signal. The detector 313 can for example be implemented using a comparator, a decision circuit, slicer, limiter etc. The detector can use any reference DC voltage. In one embodiment the reference DC voltage is ground as illustrated in FIG. 3. In addition to the connections depicted in FIG. 3, there may be AC connections (not shown).

The low-pass filtering in modules 311 can be tuned to the rate of the transmitted management data signal. For example if the management data signal is a 300 kbaud signal the low-pass filter can attenuate frequencies above 300 kHz.

Further, the receiver in FIG. 3 can be supplemented with a clock and data recovery circuit 315 to recover the management data signal. Also, if the management data signal is encoded, for example using a biphase code, the recovered management data signal must be decoded using a decoder 317 to output the management data signal. For example if the management data signal is biphase encoded, a biphase decoder is provided to generate the management data output signal.

To achieve a good performance, the input signal to the modules 311 should have an essentially equal peak-to-peak amplitude. It is not desired to have large difference, for example more than 10-20%, in peak-to-peak amplitude difference. To equalize the peak-to-peak amplitudes of the input signals of the modules 311, the receiver in FIG. 3 can be designed as follows. If the module 303 is an SFP transceiver, there is a risk of unbalanced peak-to peak amplitude input signals to the modules 311 if the SFP transceiver is exchanged. This problem can be solved by providing a buffer circuit on the path from the module 303 to the corresponding module 311. The buffer circuit is designed to generate a constant peak-to-peak output signal regardless of the performance of the module 303. In accordance with some embodiments the receiver is trimmed with regard to the peak-to-peak amplitude input signal difference to the modules 311 before being used. This will ensure a good performance.

Figure 4:
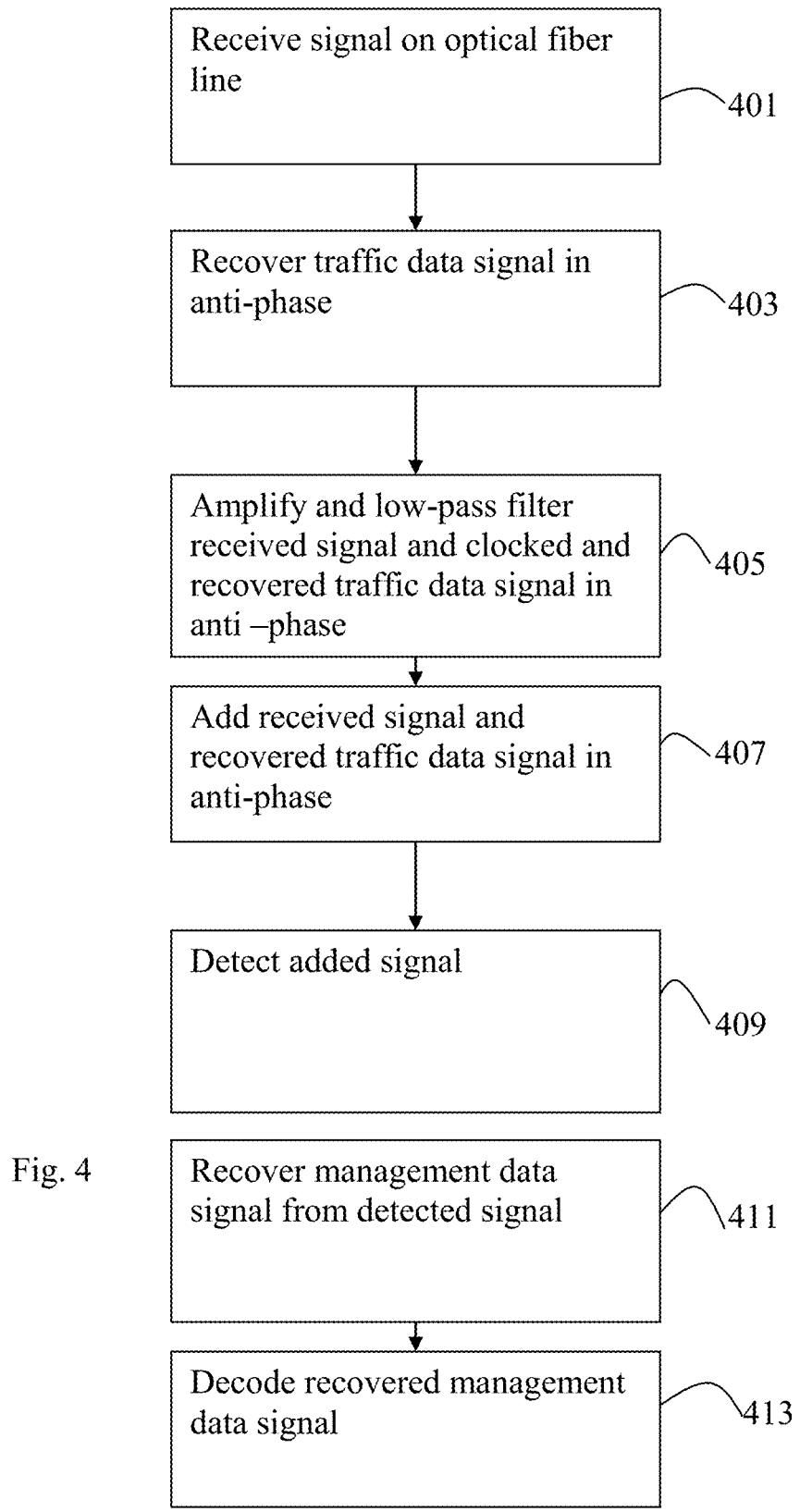
FIG. 4 is a flowchart illustrating some steps performed when receiving a data signal.

FIG. 4 is a flow chart illustrating some steps performed when receiving a management data signal. First, in a step 401, a signal on an optical fiber line is received. The received signal comprises a traffic data signal transmitted as a NRZ modulated signal. The traffic data signal has a management data signal superimposed thereon as a pulse width modulation of the symbols of the NRZ modulated traffic data signal. Next, in a step 403, the traffic data signal in anti-phase is recovered from the signal received in step 401. Next, in an optional step 405, the signal generated in steps 401 and 403 are low-pass filtered and possibly amplified. The signals generated in steps 401 and 403, possibly low-pass filtered and amplified, are then added in a step 407. The output signal generated in step 407 is then detected in a step 409 and can be used to recover the management data signal. For example the signal detected in step 409 can be recovered using a clock and data recovery circuit in a step 411. If the management data signal is not encoded the signal generated in step 411 is the transmitted management data signal. If, on the other hand, the transmitted management data signal is encoded, the output in step 411 will be the coded management data signal. When the output from step 411 is an encoded management data signal, the output from step 411 can be decoded in a step 413 using a corresponding decoder. For example, if the transmitted management data signal is biphase encoded, a biphase decoder can be used to decode the management data signal in step 413.

In an analytical mathematical model, a ratio between modulation and noise can be calculated. The model assumes that the traffic data channel is scrambled. The ratio is denoted Modulation to Noise Ratio (MNR) below. When the MNR is 12 the Bit Error Rate (BER) is about $10^{-9}$ and when the MNR is 6, the BER is about $10^{-3}$.

The MNR can be expressed as $$MNR=(y*Fb^{1.5}*C)/(2*BW)^{0.5}$$

where, y=duty cycle modulation, e.g. 60 ps corresponding to a value $60*10^{-12}$ above.

Fb=bit rate for the traffic data, e.g. 622.08 Mbit/s corresponding to a value $622.08*10^{6}$ above (this is the bitrate for the protocol, STM-4)

C=Cancellation factor, the noise factor reduction achieved by the addition of the recovered signal in anti-phase—A realistic value can typically be about assumed values 10.

BW=the bandwidth of the analogue filter used e.g. 200 kHz corresponding to $200*10^{3}$ above.

The above exemplified values would yield the below value for the MNR.

$$MNR=(60*10^{-12}*(622.08*10^{6})^{1.5}*10)/(2*200*10^{3})^{0.5}=14.72$$

MNR is then 14.72. This corresponds to a BER below $10^{-9}$, which is typically a good value that ensures a correct transmission.

Using the method and receiver as described herein will provide a transmission system where a management data signal can be transmitted simultaneously as a traffic data signal without the need for additional bandwidth. Further, the transmission rate of the management data signal can be high enough to meet the need for transmission rate in systems using a management transmission data channel.

The invention claimed is:

1. A method of receiving a management data signal in an optical transmission system, where a traffic data signal is received as a NRZ modulated signal, the traffic data signal having the management data signal superimposed thereon as a pulse width modulation of the symbols of the NRZ modulated signal, the method comprising:
   receiving the NRZ modulated signal with the data signal superimposed thereon as a first signal,
   recovering the traffic data signal from the first signal,
   adding the recovered traffic data signal in anti-phase to the received first signal, forming a second signal, and
   detecting the management data signal from the second signal as a detected management data signal.

2. The method according to claim 1, wherein the recovered data signal in anti-phase and the first data signal are low-pass filtered before being added.

3. The method according to claim 2, wherein the low-pass filter is adapted to attenuate frequencies above the frequency at which the management data signal is transmitted.

4. The method according to claim 1, wherein the recovered data signal in anti-phase and the first data signal are amplified before being added.

5. The method according to claim 1, wherein the management data signal is recovered from the detected management data signal.

6. The method according to claim 5, further comprising, when the management data signal is encoded, decoding the recovered management data signal to output the management data signal.

7. A receiver for receiving a management data signal in an optical transmission system, where a traffic data signal is received as a NRZ modulated signal, the traffic data signal having the management data signal superimposed thereon as a pulse width modulation of the symbols of the NRZ modulated signal, the receiver comprising:
   a receiver circuit adapted to receive the NRZ modulated signal with the data signal superimposed thereon as a first signal,
   a clock and data recovery circuit adapted to recover the traffic data signal from first signal in anti-phase,
   a low pass filter,
   an adder adapted to add the recovered traffic data signal in anti-phase to the received first signal to form a second signal, and a detector adapted to detect the management data signal from the second signal as a detected management data signal.

8. The receiver according to claim 7, wherein at least one low-pass filter is adapted to low-pass filter the recovered data signal in anti-phase and the first data signal.

9. The receiver according to claim 8, wherein the low-pass filter is adapted to attenuate frequencies above the frequency at which the management data signal is transmitted.

10. The receiver according to claim 7, further comprising at least one amplifier adapted to amplify the recovered data signal in anti-phase and the first data signal.

11. The receiver according to claim 7, further comprising a clock and data recovery circuit adapted to recover the management data signal from the output signal from the detector.

12. The receiver according to claim 11, further comprising a decoder adapted to decode the output signal from the clock and data recovery circuit.

13. A transmission system comprising a transmitter adapted to transmit a data signal in on optical transmission line, where the transmitter is adapted to transmit a traffic data signal as a NRZ modulated signal, the transmitter further being adapted to transmit a management data signal superimposed on the traffic data signal as a pulse width modulation of the symbols of the NRZ modulated traffic data signal, the transmission system further comprising a receiver, the receiver comprising:
- a receiver circuit adapted to receive the NRZ modulated signal with the data signal superimposed thereon as a first signal,
- a clock and data recovery circuit adapted to recover the traffic data signal from first signal in anti-phase,
- a low-pass filter
- an adder adapted to add the recovered traffic data signal in anti-phase to the received first signal, forming a second signal, and
- a detector adapted to detect the management data signal from the second signal as a detected management data signal.

* * * * *